Oct. 16, 1951 — W. L. TRAFTON — 2,571,394
MOUNTING FOR FASTENING MEMBERS AND THE LIKE
Filed June 13, 1947
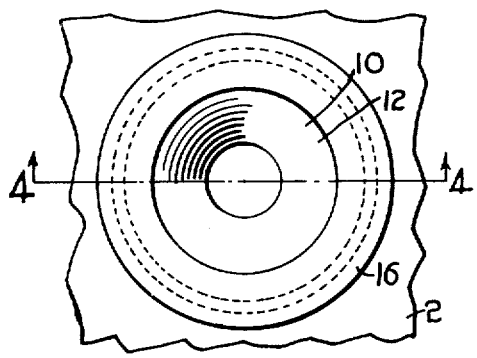
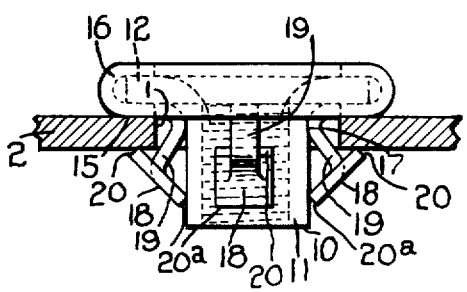
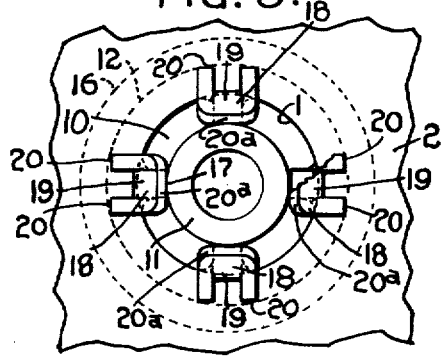
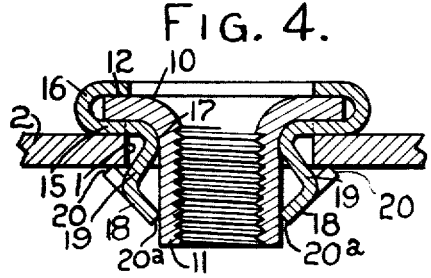
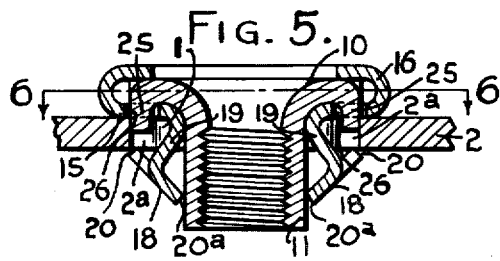
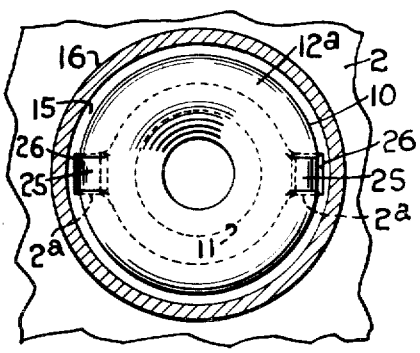
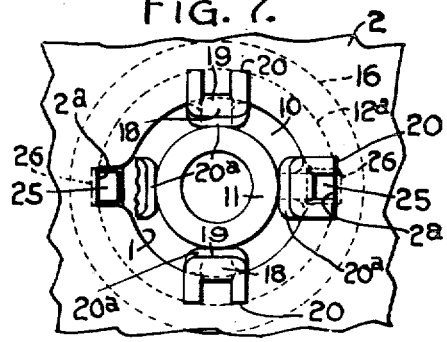
Inventor
WARREN L. TRAFTON,
By John Jodd
Attorney Patented Oct. 16, 1951

2,571,394

UNITED STATES PATENT OFFICE 2,571,394

MOUNTING FOR FASTENING MEMBERS AND THE LIKE

Warren L. Trafton, Detroit, Mich., assignor to United-Carr Fastener Corporation, Cambridge, Mass., a corporation of Massachusetts Application June 13, 1947, Serial No. 754,325

5 Claims. (Cl. 85—32)

1

The present invention relates to mountings for fastening members and the like and especially stud-engaging fastening members and aims generally to improve existing constructions of that type.

One of the primary objects of the invention is the provision of an improved mounting for stud-engaging fastener members whereby the fastener member may be readily and securely attached to an apertured support.

A further object of the invention is the provision of an improved mounting for stud-engaging fastener members which may be non-rotatably mounted in an apertured support.

A still further object of the invention is the provision of an improved fastener assembly including a sheet metal nut device and associated snap fastener mounting therefor.

The above and other objects of the invention will be apparent to persons skilled in the art to which the invention relates from a consideration of the accompanying drawings and annexed specification illustrating and describing two preferred embodiments of the invention.

In the drawings:

Fig. 1 is a top plan view of a typical installation illustrating one embodiment of the invention;

Fig. 2 is a side elevation of the installation shown in Fig. 1;

Fig. 3 is an enlarged bottom plan view of the installation shown in Figs. 1 and 2;

Fig. 4 is an enlarged vertical sectional view as taken on the line 4—4 of Fig. 1;

Fig. 5 is an enlarged vertical sectional view of a modified form of the invention;

Fig. 6 is a horizontal sectional view of the assembly shown in Fig. 5, as taken on the line 6—6 thereof; and Fig. 7 is a bottom plan view of the installation shown in Fig. 5.

Referring to the drawings, the invention comprises a retainer or attaching member adapted for snap fastener engagement with an apertured support and provided with means for assembling therewith a stud-engaging fastener member, herein illustrated as a screw threaded nut device.

In installations wherein the fastening is screw threaded, I prefer that the stud-engaging fastening device be a sheet metal nut member 10, preferably a nut of the type having a tubular internally threaded barrel 11 and an integral laterally extending flange 12 at one end of the barrel.

Referring to Figs. 1 to 4 of the drawings, the retainer or attaching member advantageously may comprise a base portion 15 having a peripheral rim 16 or the like for engagement with the flange 12 or edge portion of the stud-engaging fastener member, said base portion being centrally apertured as at 17 for the passage of the stud, and if desired, a part of the stud-engaging fastener member. In the illustrated embodiment, the aperture or opening 17 in the bottom of the base portion 15 of the retainer or attaching member is of sufficient size to permit the passage of the nut barrel 11 therethrough.

The retainer or attaching member is provided with support-engaging means adapted for insertion through an aperture 1 of a suitable support 2 and preferably of a type having snap-fastener locking engagement with a face of the support 2 opposite the base portion 15. Preferably, and according to the illustrated embodiment of the invention, the support-engaging means may be formed from portions of the base portion displaced to provide the aperture 17.

As herein illustrated, the support-engaging means comprises an annular series of support-engaging fingers 18 spaced from the base portion 15 of the retainer on the side opposite the peripheral retaining rim 16 and integrally connected thereto by resilient connecting arms 19 joined to the fingers 18 adjacent the center thereof so that portions of the fingers 18 extend beyond the arms 19 in opposite directions. Preferably the fingers are obliquely disposed with respect to the axis of the stud-engaging fastener member 10 and support aperture 1, and is of such length that opposite ends 20—20ª thereof, respectively, bear against a face of the support and a part of the stud-engaging fastener member, for example the barrel 11. The connecting arms 19, connecting the fingers 18 and base portion 15, are so shaped, as for example ogee or generally S-shaped, as to resiliently maintain the fingers 18 in a divergent oblique position with reference to the axis of the stud-engaging fastener part, but permit their flexing to a position more closely parallel to the walls of the aperture 1 as the support-engaging members are forced therethrough.

As will be apparent, the inner diameter of the annular series of support-engaging fingers, as determined by the ends 20ª, is less than that of the support aperture 1, while the outer normal diameter of the series of fingers 18, as determined by the ends 20, is greater than that of the support aperture 1.

From the above it will be apparent that the retainer and stud-engaging fastener part, herein illustrated as the flanged sheet metal nut 10 may be pre-assembled and attached as a unit to the support 2 by inserting the barrel 11 of the nut device 10 and the surrounding support-engaging means 18 through the aperture 1 of the support 2. The ends 20a of the support-engaging fingers 18 furthermost removed from the base part 15 readily enter the aperture 1 and the fingers 18 will be flexed toward a position parallel with the walls of the aperture until the unit is fully inserted, when the fingers 18 snap to a divergent oblique position and lockingly engage the support 2. The unit is thus securely clamped to the support 2 which is positioned between the base portion 15 and ends 20 of the fingers 18.

The locking action of the fingers 18 resists any tendency of the unit being displaced from the support 2 toward the retaining rim side, as for example under the clamping action of a screw (not shown) which may be passed through a part to be attached to the support (not shown) into threaded engagement with the barrel 11 at its end away from the base portion 15. During such clamping action the fingers 18 are tightly wedged between the barrel 11 and support 2.

In Figs. 5, 6 and 7 I have illustrated a modified form of a mounting in which the unit, and particularly the stud-engaging fastener member, is non-rotatively mounted in the support.

According to this form of the invention, a bearing portion of the stud-engaging fastener part, for example the flange 12a of the nut member 10 may be formed with two or more inturned lugs 25 extending through and beyond openings 26 in the base portion 15 of the retainer or attaching member. The protruding ends of these lugs are adapted to be seated in radial elongations 2a of the support aperture 1, and thus prevent rotation of the fastener unit in the support 2.

Although I have illustrated and described two embodiments of the invention, I do not intend to be restricted thereto as the scope of the invention is best defined by the appended claims. It will be further understood that the particular type of stud-engaging fastener member as well as the particular manner of securing the stud-engaging fastener member to the retainer will include other forms than that shown in the drawings, which are intended for illustrative purposes only.

I claim:

1. A fastener unit comprising a stud-engaging fastener part having a tubular stud-receiving barrel and a laterally disposed flange at one end thereof, a retainer formed with an apertured base portion surrounding said barrel and including portions securing said base portion to the flange of said fastener part, and support-engaging fingers integral with said base portion and disposed radially of said barrel of the stud-engaging fastener part, said fingers having their outer ends disposed adjacent said barrel and intermediate portions radially spaced from said barrel providing snap fastener means for engaging the walls of an aperture in a support.

2. A fastener unit comprising a stud-engaging fastener part having a tubular stud-receiving barrel and a laterally disposed flange at one end thereof, a retainer formed with an apertured base portion surrounding said barrel and including peripheral portions engaging opposite faces of said flange, an annular series of support-engaging fingers surrounding said barrel and obliquely disposed with respect to the axis thereof, and resilient means connecting said base portion and support-engaging fingers, said fingers having their outer ends disposed adjacent said barrel and portions opposite said outer ends radially spaced from said barrel providing snap fastener means for engagement with an apertured support.

3. A fastener unit comprising a stud-engaging barrel part having a tubular stud-receiving barrel and a laterally disposed flange at one end thereof, a retainer formed with an apertured base portion surrounding said barrel and including peripheral flange portions overlying a face of said flange opposite said base portion, a plurality of support-engaging attaching members disposed adjacent said barrel and resilient connecting means connecting said base portion and attaching members, said support-engaging members being normally obliquely disposed relative to said barrel and having opposing terminal ends, one terminal end of each support-engaging member being disposed adjacent said barrel and the other terminal end being spaced from said barrel and disposed adjacent to but spaced from said base portion, said attaching members being adapted thereby to have bearing engagement with said barrel and a surface of an apertured support in which said unit is mounted.

4. A fastener unit comprising a stud-engaging fastener part having a tubular internally threaded barrel and a laterally disposed flange at one end thereof, a mounting member for said fastener part having a base portion formed with a barrel-receiving aperture surrounding said barrel, a peripheral flange extending from said base portion and overlying said lateral flange for securing the base portion to said laterally disposed flange, a plurality of support-engaging and locking members adjacent the outer wall of said barrel and obliquely disposed thereto, and resilient means connecting said support-engaging and locking members with said base portion, said support-engaging and locking members having opposite terminal ends, one terminal end of each being disposed adjacent the end of said barrel opposite said lateral flange and the opposite terminal end being radially spaced from said barrel and disposed adjacent to but spaced from said base portion, intermediate portions of said support-engaging and locking members providing obliquely disposed camming surfaces whereby said support-engaging and locking members may be caused to move to a less oblique position relative to the wall of said barrel as they are forced through an aperture of a support and to thereafter expand and lockingly engage a surface of a support with a snap action with opposite ends in bearing engagement with said barrel and a surface of a support.

5. A fastener unit comprising a stud-engaging fastener part having a tubular internally threaded barrel and a laterally disposed flange at one end thereof, a mounting member for said fastener part having a base portion formed with a barrel-receiving aperture surrounding said barrel, a flange extending from the peripheral edge of said base portion and overlying said lateral flange for securing the base portion to said laterally disposed flange, a plurality of support-engaging and locking members adjacent the outer wall of said barrel and obliquely disposed thereto, and resilient means connecting support-engaging and locking members with said base portion, said support-engaging and locking members having opposite terminal ends, one terminal end of each being disposed adjacent the end of said barrel opposite said lateral flange and the opposite terminal end being radially spaced from said barrel and disposed adjacent to but spaced from said base portion, intermediate portions of said support-engaging and locking members providing obliquely disposed camming surfaces adapted to move to a less oblique position relative to the wall of said barrel as they are forced through an aperture of a support and to thereafter expand and lockingly engage a surface of a support with a snap action, and fastener-part rotation-resisting fingers on said laterally disposed flange and extending through and beyond the base portion of said mounting member is spaced relation to the walls of said barrel.

WARREN L. TRAFTON.

REFERENCES CITED

The following references are of record in the file of this patent:

UNITED STATES PATENTS

| Number | Name | Date |
| --- | --- | --- |
| 1,760,834 | Carr | May 27, 1930 |
| 2,181,966 | Dean | Dec. 5, 1939 |
| 2,239,255 | Shaw | Apr. 22, 1941 |
| 2,255,650 | Burke | Sept. 9, 1941 |
| 2,255,971 | Hall | Sept. 16, 1941 |
| 2,283,674 | Geyer | May 19, 1942 |
| 2,404,372 | Hallock | July 23, 1946 |

Certificate of Correction

Patent No. 2,571,394                                          October 16, 1951

WARREN L. TRAFTON

It is hereby certified that error appears in the printed specification of the above numbered patent requiring correction as follows:

Column 4, line 6, for "barrel" read *fastener*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*